UNITED STATES PATENT OFFICE.

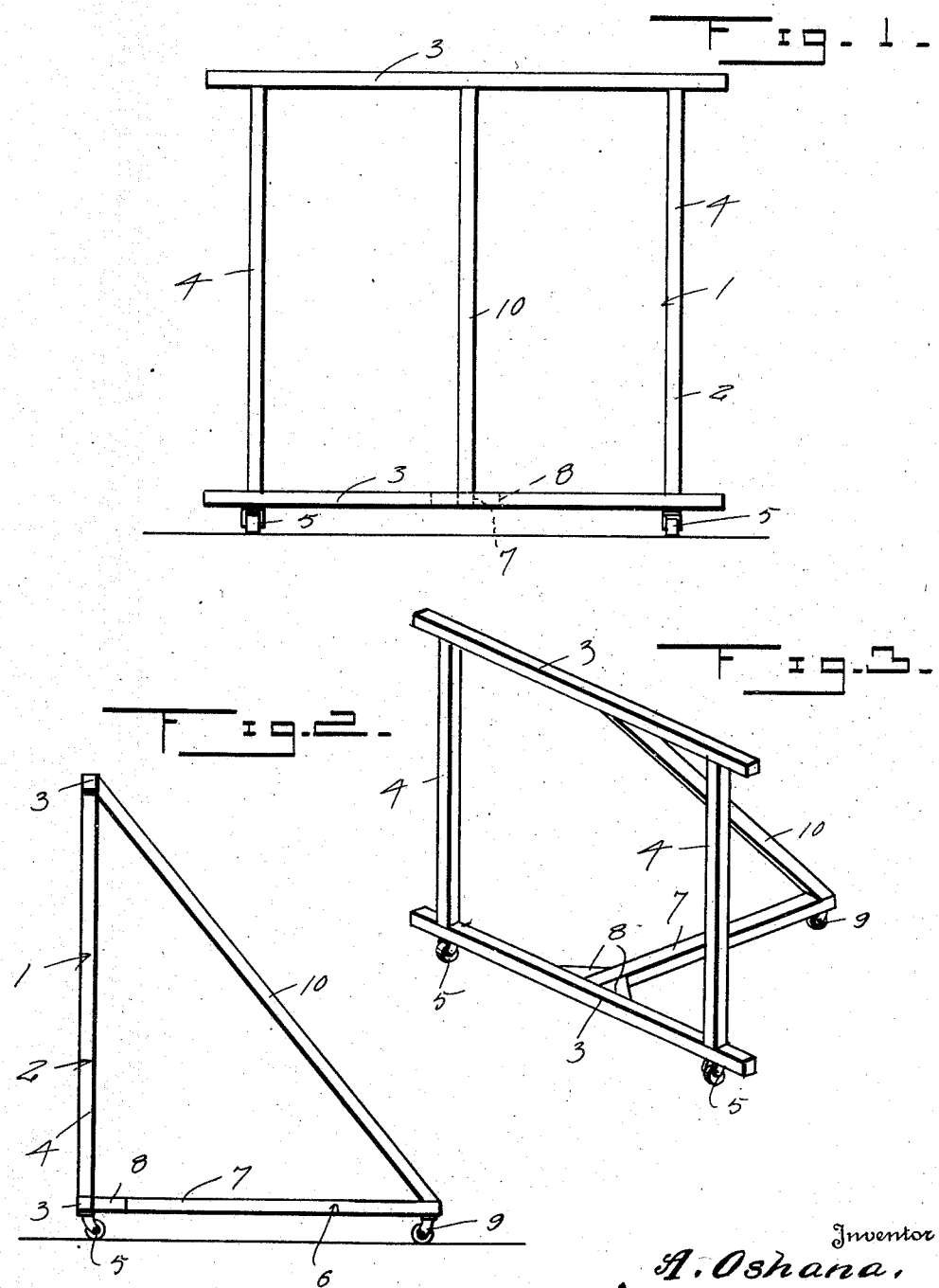

AGHASIE OSHANA, OF MASON CITY, IOWA.

BABY-WALKING DEVICE.

1,300,292.   Specification of Letters Patent.   Patented Apr. 15, 1919.

Application filed March 1, 1918.   Serial No. 219,836.

*To all whom it may concern:*

Be it known that I, AGHASIE OSHANA, a citizen of the United States, residing at Mason City, in the county of Cerro Gordo and State of Iowa, have invented certain new and useful Improvements in Baby-Walking Devices; and I do hereby declare the following to be a full, clear, and exact description of the invention, such as will enable others skilled in the art to which it appertains to make and use the same.

This invention relates to baby walkers and the primary object of the invention is to provide an improved baby walking device which will teach the baby to walk in an efficient manner and prevent the baby from falling while learning.

Another object of the invention is to provide an improved baby walking device including a front frame, having a horizontal bar for the baby to grasp and a forwardly projecting ground engaging member which prevents the frame from being pushed over and acts as a guard or bumper for the same.

Another object of the invention is to provide an improved baby walking device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawing, forming a part thereof, in which:—

Figure 1 is a rear elevation of the improved baby walking device showing the frame against which the baby leans, Fig. 2 is a side elevation of the improved device, and Fig. 3 is a detail perspective view of the device.

Referring to the drawing, in detail, wherein similar reference numerals designate corresponding parts through the several views, the numeral 1 generally indicates the improved baby walking device, which includes the rear frame 2 against which the baby leans. The rear frame 2 includes a pair of spaced horizontal bars 3 connected adjacent their ends by vertical bars 4. The vertical bars 4 can be connected to the horizontal bars 3 in any well known manner, such as the ordinary mortise and tenon joints. A pair of spaced casters 5 are mounted adjacent the ends of the lower horizontal bars 3 immediately beneath the vertical bars 4 and provide means for supporting the rear frame, whereby the same can be readily pushed around by the baby learning to walk. The rollers 5 are swivelly mounted to the frame in the ordinary or any preferred manner. The upper horizontal bar 3 is adapted to be grasped by the baby, and as a baby, while learning to walk, always leans forward upon whatever it holds onto, a forwardly projecting frame 6 is provided for preventing the rear frame 2 from tipping forwardly. The front frame 6 consists of a forwardly projecting horizontal bar 7 which is secured to the forward face of the lower horizontal bar 3 at the central portion thereof. Suitable angle braces 8 are provided for preventing the twisting of the bar. A caster or roller 9 is swivelly secured in the ordinary manner to the forward end of the bar 7 and provides means for engaging the ground to prevent the frame from tilting forwardly. Inclined brace bars 10 extend from the central portion of the forward face of the upper horizontal bar 3 to the extreme outer end of the forwardly projecting bar 7 and form additional means for strengthening the structure.

In operation of the improved device, the baby learning to walk stands up and takes hold of the upper horizontal bar 3 and leans forwardly in the ordinary manner, which starts the frame moving on the casters 5 and 9 and the baby steps forwardly therewith. The forwardly projecting bar 7 prevents the frame from tipping forwardly and also acts as a guard or bumper and prevents the baby from running into articles.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

A baby walking device comprising a pair of spaced parallel horizontal superimposed members, vertical members connecting the horizontal members adjacent to the ends thereof, a forwardly projecting bar secured to the central portion of and extending at right angles to the lower member, an inclined brace connecting the forward end of the bar to the central portion of the upper member, and rollers mounted on the lower surface of the lower member adjacent to the terminals thereof and on the free end of the bar, as and for the purpose specified.

In testimony whereof I affix my signature in presence of two witnesses.

AGHASIE OSHANA.

Witnesses:
R. C. SMITH,
W. K. MACALLISTER.